US009509569B2

(12) United States Patent
Riedl et al.

(10) Patent No.: US 9,509,569 B2
(45) Date of Patent: Nov. 29, 2016

(54) INTERMEDIATE NETWORK IN A RING TOPOLOGY, AND METHOD FOR SETTING UP A NETWORK CONNECTION BETWEEN TWO NETWORK DOMAINS

(75) Inventors: Johannes Riedl, Ergolding (DE); Matthias Scheffel, Unterhaching (DE)

(73) Assignee: Siemens Aktiengesellschaft, München (DE)

( * ) Notice: Subject to any disclaimer, the term of this patent is extended or adjusted under 35 U.S.C. 154(b) by 84 days.

(21) Appl. No.: 13/985,262

(22) PCT Filed: Jan. 30, 2012

(86) PCT No.: PCT/EP2012/051396
§ 371 (c)(1),
(2), (4) Date: Aug. 13, 2013

(87) PCT Pub. No.: WO2012/110300
PCT Pub. Date: Aug. 23, 2012

(65) Prior Publication Data
US 2013/0315103 A1    Nov. 28, 2013

(30) Foreign Application Priority Data

Feb. 14, 2011   (DE) .................. 10 2011 004 064

(51) Int. Cl.
*H04L 12/28* (2006.01)
*H04L 12/24* (2006.01)
(Continued)

(52) U.S. Cl.
CPC ............. *H04L 41/12* (2013.01); *H04L 12/437* (2013.01); *H04L 12/462* (2013.01)

(58) Field of Classification Search
CPC . H04L 41/12; H04L 12/462; H04L 12/2863; H04L 12/4625
See application file for complete search history.

(56) References Cited

U.S. PATENT DOCUMENTS

| 7,003,705 | B1 * | 2/2006 | Yip ...................... H04L 12/437 370/216 |
| 7,274,656 | B2 * | 9/2007 | Lee ........................ H04J 3/085 370/223 |
| 7,289,428 | B2 * | 10/2007 | Chow et al. ................. 370/216 |

(Continued)

OTHER PUBLICATIONS

Santos and Nokia, "Method to Be Run in and Device of a Network as Well as Communication System Comprising Such Device", Feb. 12, 2009, WIPO, WO 2009/019257 A2.*

(Continued)

*Primary Examiner* — Brian O'Connor
(74) *Attorney, Agent, or Firm* — Lempia Summerfield Katz LLC

(57) ABSTRACT

An intermediate network in a ring topology includes a first marginal node and a second marginal node in a first network domain. The first and second marginal nodes are connected to one another by a first network connection within the first network domain. The intermediate network includes a third marginal node and a fourth marginal node, in a second network domain. The third marginal node and the fourth marginal node are connected to one another by a second network connection within the second network domain. A first virtual network connection connects the first and the third marginal nodes via an intermediate network. A second virtual network connection connects the second and the fourth marginal nodes via the intermediate network. The first network connection, the second network connection, the first virtual network connection, and the second virtual network connection have a ring topology on which a connection redundancy protocol is implemented.

8 Claims, 2 Drawing Sheets

(51) Int. Cl.
*H04L 12/437* (2006.01)
*H04L 12/46* (2006.01)

(56) References Cited

U.S. PATENT DOCUMENTS

| | | | |
|---|---|---|---|
| 7,345,991 B1* | 3/2008 | Shabtay et al. | 370/221 |
| 7,385,919 B2* | 6/2008 | Koestner | H04L 1/22 370/222 |
| 7,688,716 B2* | 3/2010 | Pande | H04L 12/1868 370/222 |
| 8,175,078 B2* | 5/2012 | Voit et al. | 370/351 |
| 8,208,369 B2* | 6/2012 | Wu | H04L 12/437 370/216 |
| 8,264,954 B2* | 9/2012 | Santos | H04L 12/437 370/222 |
| 8,570,857 B2* | 10/2013 | Scholl | H04L 12/66 370/216 |
| 8,717,879 B2* | 5/2014 | Santos | H04L 12/437 370/216 |
| 2003/0031124 A1 | 2/2003 | Chow et al. | |
| 2003/0074469 A1* | 4/2003 | Busi et al. | 709/238 |
| 2006/0221868 A1 | 10/2006 | de Heer et al. | |
| 2009/0059800 A1 | 3/2009 | Mohan | |
| 2009/0059809 A1 | 3/2009 | Gould et al. | |
| 2009/0268627 A1* | 10/2009 | de Frias Rebelo Nunes | H04L 12/413 370/252 |
| 2010/0232322 A1* | 9/2010 | Umayabashi et al. | 370/256 |
| 2012/0201127 A1* | 8/2012 | Voit et al. | 370/225 |

OTHER PUBLICATIONS

German Office Action dated Nov. 10, 2011 for corresponding German Patent Application No. DE 10 2011 004 064.1 with English translation.
PCT International Search Report and Written Opinion of the International Searching Authority dated Mar. 12, 2012 for corresponding PCT/EP2012/051396 with English translation.
J. Ryoo et al., "Ethernet Ring Protection for Carrier Ethernet Networks," IEEE Communications Magazine, IEEE Service Center, Piscataway, U.S., vol. 46, pp. 1-14, 2008.

* cited by examiner

INTERMEDIATE NETWORK IN A RING TOPOLOGY, AND METHOD FOR SETTING UP A NETWORK CONNECTION BETWEEN TWO NETWORK DOMAINS

The present patent document is a §371 nationalization of PCT Application Serial Number PCT/EP2012/051396, filed Jan. 30, 2012, designating the United States, which is hereby incorporated by reference. This patent document also claims the benefit of DE 10 2011 004 064.1, filed on Feb. 14, 2011, which is also hereby incorporated by reference.

BACKGROUND

The present embodiments relate to an intermediate network in a ring topology.

Ethernet-network domains may be connected to one another via virtual Ethernet connections via an intermediate network in order to facilitate network traffic between otherwise disjoint network domains. For example, in industrial applications (e.g., in factory or process automation), the requirements for reliability and failsafe operation of such Ethernet links are very high in order to provide the security of the networked components.

These Ethernet connections between network domains may be implemented via virtual private networks (VPN) (e.g., a virtual private wire service (VPWS) or a specially preconfigured virtual local network (VLAN)). These virtual private network connections are established via an intermediate network, the operation of which may be outside the sphere of influence of the network domain operator.

Network traffic between two network domains connected via such an intermediate network with the help of virtual private network connections may be controlled such that there are no unwanted data traffic loops. Network security is to be established in the network traffic between the network domains, which may capture failures of network components in the intermediate network without being dependent upon the security measures of the intermediate network operator.

The two network domains may, for example, be integrated into a joint network with cross-domain redundancy protocols such as RSTP, for example. However, this requires a high implementation cost. This also requires a large amount of planning in order to keep network-domain-internal network traffic inside the domain (e.g., to prevent network traffic that is supposed to take place within a domain from being routed via the intermediate network, thus causing unnecessary costs and latencies).

Alternatively, proprietary protocols that permit additional information to be exchanged via individual connections between the network domains and thus to respond to any faults that may occur may be used. This solution, however, lacks flexibility and requires a high level of adaptation to the existing infrastructure.

SUMMARY AND DESCRIPTION

There is therefore a need for easier and effective solutions for connecting network domains with one another via an intermediate network.

The present embodiments may obviate one or more of the drawbacks or limitations in the related art. For example, two disjoint network domains that are interconnected via an intermediate network and exchange network traffic via the intermediate network are connected to one another such that, in the event of a failure in any component in or at an edge of the intermediate network, the network connection between the network domains remains guaranteed. Redundant virtual network connection paths are established through the intermediate network, the management and control of which is independent of the network connection actually implemented by the intermediate network. This offers the advantage that the network traffic between two network domains may be protected by an intermediate network on the part of the network domains without being dependent upon the security mechanisms in the intermediate network, which are often outside the sphere of influence of the network domain operators.

One embodiment includes an intermediate network in a ring topology for setting up a connection between two network domains. The intermediate network includes a first marginal node and a second marginal node. The first marginal node and the second marginal node are marginal nodes in a first network domain and are connected to one another by a first network connection within the first network domain. The intermediate network also includes a third marginal node and a fourth marginal node. The third marginal node and the fourth marginal node are marginal nodes in a second network domain and are connected to one another via a second network connection within the second network domain. The intermediate network includes a first virtual network connection that connects the first marginal node and the third marginal node via the intermediate network, and a second virtual network connection that connects the second marginal node and the fourth marginal node via the intermediate network. The first network connection, the second network connection, the first virtual network connection, and the second virtual network connection have a ring topology on which a connection redundancy protocol is implemented.

According to an embodiment, the first network domain and/or the second network domain may be Ethernet/Layer 2 domains.

According to a further embodiment, the first virtual network connection and the second virtual network connection may be virtual private network connections on Layer 2.

According to a further embodiment, the connection redundancy protocol may be a Spanning Tree Protocol (STP) (e.g., a Rapid Spanning Tree Protocol (RSTP), a Media Redundancy Protocol (MRP), an Ethernet Ring Protection Protocol (ERP) or an Ethernet Automatic Protection Switching Protocol (EAPS)). Such protocols are tested redundancy protocols that may be easily integrated into the existing network domain infrastructure due to standardization.

According to a further embodiment, a domain-internal connection redundancy protocol may be implemented in the first network domain and/or the second network domain, respectively. By linking a connection redundancy protocol in the intermediate network and connection redundancy protocols in the network domains themselves, failures of virtual network connections in the intermediate network may be responded to efficiently and quickly.

In one embodiment, a method for setting up a network connection between two network domains is provided. The method includes establishing a first virtual network connection between a first marginal node of a first network domain and a second marginal node of a second network domain via an intermediate network. The method also includes establishing a second virtual network connection between a third marginal node of the first network domain connected with the first marginal node, and a fourth marginal node of the second network domain connected with the second marginal node via the intermediate network. The method includes implementing a connection redundancy protocol in a ring topology formed by the first marginal node, the second marginal node, the third marginal node, and the fourth marginal node.

This has the advantage that loops and ring closures within the ring topology of the marginal nodes may be avoided by the intermediate network The implementation of a connection redundancy protocol may include designating a marginal node as a master node, blocking the virtual network connection assigned to the designated master node for network traffic between the first network domain and the second network domain, and releasing the respective other virtual network connection for network traffic between the first network domain and the second network domain.

In this way, network-domain-internal data traffic may take place within the respective network domain between the associated marginal nodes without rerouting of data traffic via the virtual network connections being necessary. For example, data traffic via the virtual network connections may be restricted only to the necessary network traffic between the two network domains.

The blocked virtual network connection may be released in the event of a fault occurring in the released virtual network connection. By this redundancy, a failure in a virtual network connection may be responded to on the network domain side regardless of the type and duration of the fault. The interrupted virtual network connection is therefore advantageously protected by the initially blocked and redundantly held virtual network connection.

DETAILED DESCRIPTION OF THE DRAWINGS

Figure 1:
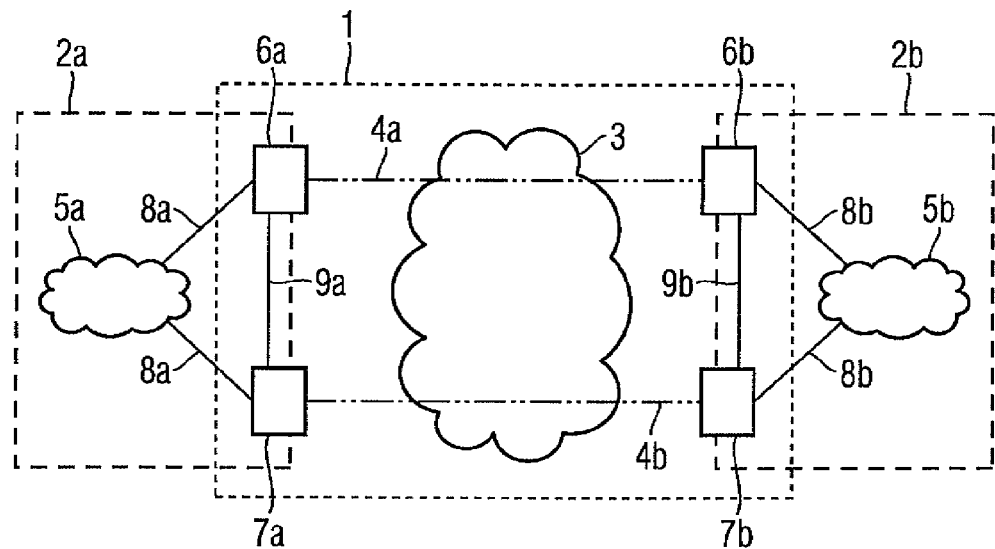
FIG. 1 is a schematic diagram of one embodiment of a network domain architecture with an intermediate network.

The described developments and further developments may be combined with one another. Further possible developments, further developments and implementations also include not explicitly mentioned combinations of features described above or below with regard to the exemplary embodiments.

The accompanying drawings are intended to provide a further understanding of the embodiments. The drawings illustrate embodiments and, in combination with the description, serve to clarify the principles and concepts. Other embodiments and many of the advantages mentioned will emerge with regard to the drawings. The elements of the drawings are not necessarily drawn to scale. The same reference characters designate the same or similarly operating components.

Network domains are self-contained networks with network nodes and network connections between the network nodes. These network domains have marginal nodes, which, in addition to connections to the network domains themselves, are able to provide connections from the network domains. Network domains may, for example, be production cells or control stations in a production plant or system, machine cells in factories, automation components in an automation plant or similar components provided with an internal network. Such network domains may be operated with a communication protocol on communication Layer 1 and/or 2 (e.g., physical layer or data link layer; an Ethernet protocol (in a PROFINET framework)).

Connection redundancy protocols may be network protocols that deactivate redundant paths in networks in order to avoid unwanted network traffic ring closures and activate the deactivated paths in the event of network failures in order to safeguard network traffic security in the network. Such connection redundancy protocols may, for example, be Spanning Tree Protocols (STP) such as the Rapid Spanning Tree Protocol (RSTP), the Media Redundancy Protocol (MRP), the Media Redundancy Real-Time Protocol (MRRT), the Ethernet Ring Protection Protocol (ERP), the Ethernet Automatic Protection Switching Protocol (EAPS), the High-Availability Seamless Redundancy Protocol (HSR) or the Parallel Redundancy Protocol (PRP). Other redundancy protocols on communication Layer 1 or 2 may also be used.

FIG. 1 shows a schematic diagram of a network domain architecture with an intermediate network 1. The intermediate network 1 connects two disjoint network domains 2a and 2b. The network domains 2a and 2b each have a domain-internal network or core network 5a, 5b, which are connected with marginal nodes 6a, 6b or 7a, 7b via connections 8a, 8b. The marginal nodes 6a, 6b or 7a, 7b provide connection options outside the network domains 2a, 2b and are connected to one another respectively via marginal connections 9a, 9b. The marginal connections 9a, 9b may include other components that are not illustrated.

These marginal nodes 6a and 6b are connected via a first virtual network connection 4a via the intermediate network 3, and the marginal node 7a and 7b via a second virtual network connection 4b via the intermediate network 3. The virtual network connections 4a, 4b are each tunneled connections on the basis of virtual private network connections (VPN) (e.g., the virtual network connections 4a, 4b are transparent with regard to possible interposed (not shown) network components of the intermediate network 3). The virtual network connections 4a, 4b are each independent of one another (e.g., node- and edge-disjoint). Since the intermediate network is based on virtual network connections 4a, 4b, the intermediate network may also be described as a virtual intermediate network.

Figure 2:
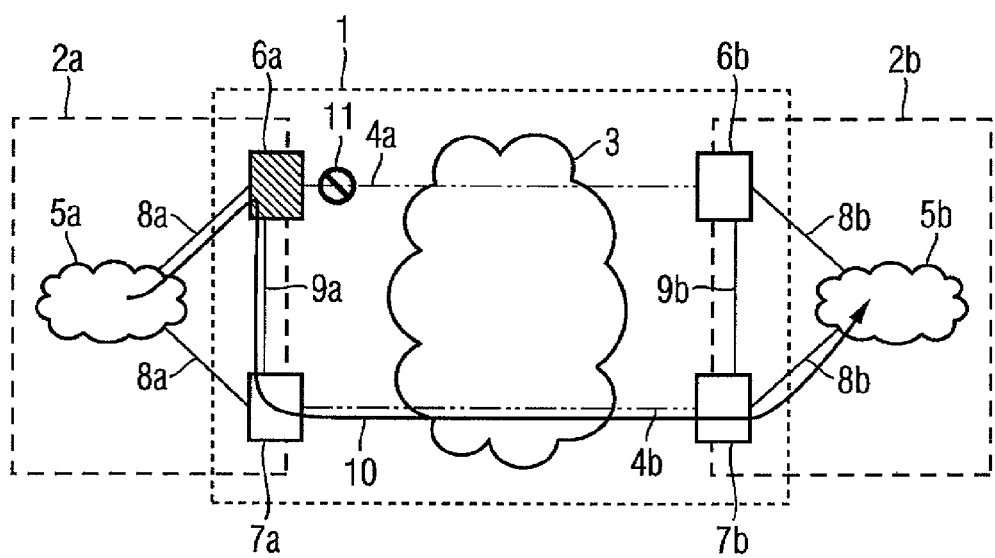
FIG. 2 is a schematic diagram of one embodiment of an implementation of a connection redundancy protocol in an intermediate network.

FIG. 2 shows a schematic diagram of an implementation of a connection redundancy protocol in the intermediate network 1. The marginal nodes 6a, 7a, 6b, 7b, together with the network connections, 9a, 9b and the virtual network connections form a ring topology for the intermediate network 1. A connection redundancy protocol is implemented in this ring topology, which prevents unwanted network traffic loops occurring. The connection redundancy protocol is configured initially to select one of the marginal nodes 6a, 7a, 6b, 7b as the master node (e.g., as the node that manages and controls the forwarding of data via the available network connections 4a, 4b, 9a and 9b). By way of example, FIG. 2 shows the marginal node 6a selected as the master node. In one embodiment, one of the other marginal nodes 6b, 7a or 7b may be selected as the master node. In the example shown in FIG. 2, the marginal nodes 6b, 7a, 7b are slave nodes subordinate to the master node 6a that are subject to control by the master node 6a.

Within the connection redundancy protocol, the master node 6a prevents unwanted network traffic loops from forming. For this purpose, a ring closure via the network connections 4a, 4b, 9a and 9b is prevented, where, for example, one of the network connections (in FIG. 2, the network connection 4a) is blocked for normal network traffic. Thus, a port 11 of the master node 6a, which is used for communication with the marginal node 6b, may be blocked. The blocked network connection may be one of the two virtual network connections 4a, 4b, so that network-domain-internal network traffic (e.g., network traffic within the network domain 2a) may also continue to be routed via the network connection 9a without having to carry out a costly rerouting at high latency via the intermediate network 3.

Network traffic generated in the core network 5a of the network domain 2a and to be transferred to the core network 5b of the network domain 2b is labeled by way of example with the reference character 10. This network traffic 10 may be routed initially to the master node 6a via the network connection 8a. At the master node 6a, the network traffic is not routed via the blocked virtual network connection 4a through the intermediate network 3, but is transferred to the marginal node 7a via the marginal connection 9a. From there, the network traffic 10 is transferred via the prioritized virtual network connection 4b via the intermediate network 3 to the marginal node 7b, from where the network traffic 10 is transferred via the network connection 8b to the core network 8b.

Figure 3:
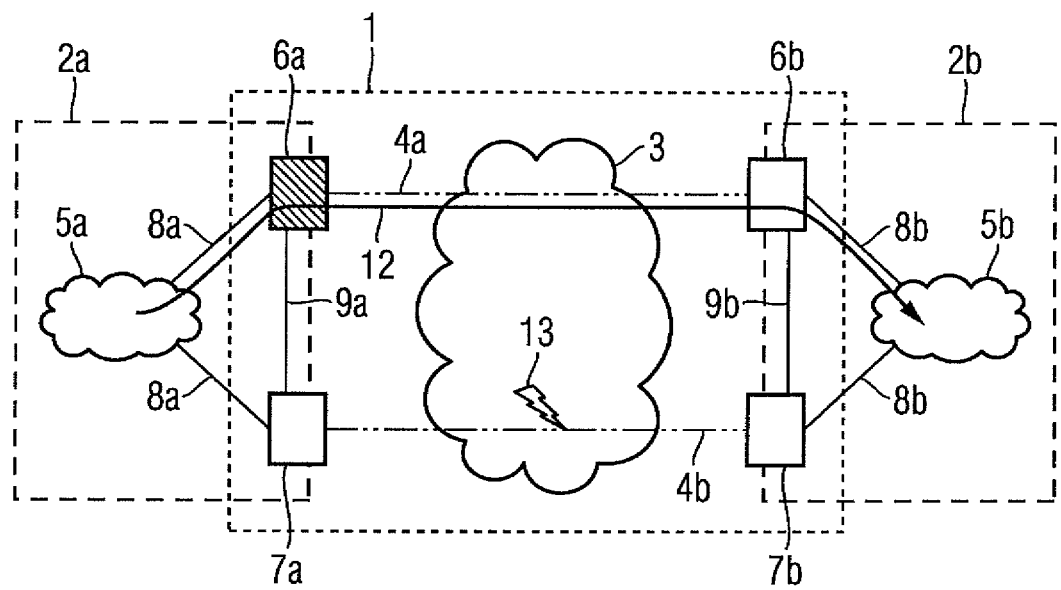
FIG. 3 is a schematic diagram of one embodiment of a network connection protection in the event of a connection fault in an intermediate network.

FIG. 3 shows a schematic diagram of a network connection protection in the event of a connection fault 13 in an intermediate network 1.

The intermediate network 1 in FIG. 3 corresponds to the intermediate network 1 in FIG. 2, in which the marginal node 6a has been selected as the master node by way of example. FIG. 3 furthermore illustrates the case in which a fault 13 has occurred in the intermediate network 3. The fault 13 may, for example, be a node failure, a connection failure, a connection interruption, a power failure or other permanent or temporary fault, which prevents the smooth and faultless operation of network traffic transmission via the prioritized virtual network connection 4b. In one embodiment, the fault 13 may be detected by the absence and/or non-receipt of a predefined number of "hello" messages from marginal node 7b to marginal node 7a. As soon as a fault 13 has been detected in the virtual network connection 4b, countermeasures may be initiated within the connection redundancy protocol of the intermediate network 1.

In one embodiment, the master node 6a may release the hitherto blocked, redundant virtual network connection 4a for normal network traffic. This may be effected permanently or until such time as the fault 13 within the intermediate network 3 has been eliminated.

In one embodiment, the master node 6a itself may fail. Within the connection redundancy protocol, one of the remaining marginal nodes 6b, 7a, 7b may be defined as the new master node, and network traffic may be diverted via the remaining connections 8a, 4b, 8b and 9b to the exclusion of the failed marginal node 6a.

Figure 4:
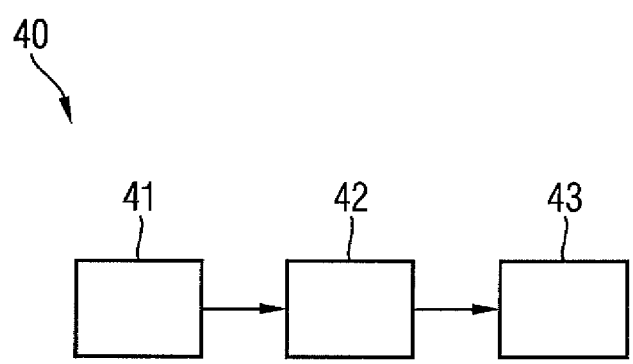
FIG. 4 is a schematic diagram of one embodiment of a method for setting up a redundantly protected network connection between two network domains.

FIG. 4 shows a schematic diagram of one embodiment of a method 40 for setting up a redundantly protected network connection between two network domains (e.g., between two network domains, as shown in FIGS. 1 to 3). A marginal node is designated as the master node in act step 41. In act 42, the virtual network connection that is assigned to the designated master node is blocked for network traffic between the first and the second network domain. In another act, the respective other virtual network connection is released for network traffic between the first and the second network domain.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An intermediate network in a ring topology for setting up a connection between two network domains, the intermediate network comprising:
    a first marginal node and a second marginal node that are marginal nodes in a first network domain and are connected to one another via a first network connection within the first network domain;
    a third marginal node and a fourth marginal node that are marginal nodes of a second network domain and are connected to one another via a second network connection within the second network domain;
    a first virtual network connection that only connects the first marginal node and the third marginal node via the intermediate network;
    a second virtual network connection that only connects the second marginal node and the fourth marginal node via the intermediate network,
    wherein the first network connection, the second network connection, the first virtual network connection and the second virtual network connection form a ring topology on which a connection redundancy protocol is implemented,
    wherein the connection redundancy protocol is configured to select one marginal node of the first marginal node, the second marginal node, the third marginal node, and the fourth marginal node as a master node, and the master node is configured to block a port to one virtual network connection either of the first virtual network connection or the second virtual network connection preventing network traffic over a virtual network, such that network loops are prevented, and
    wherein when a failure occurs, the master node is configured to unblock the port to the one virtual network connection, allowing network traffic over the virtual network.

2. The intermediate network as claimed in claim 1, wherein the first network domain, the second network domain, or the first network domain and the second network domain are Ethernet/Layer 2 domains.

3. The intermediate network as claimed in claim 2, wherein the first virtual network connection and the second virtual network connection are virtual private network connections on Layer 2.

4. The intermediate network as claimed in claim 2, wherein the connection redundancy protocol comprises a Spanning Tree Protocol, a Media Redundancy Protocol, an Ethernet Ring Protection Protocol or an Ethernet Automatic Protection Switching Protocol.

5. The intermediate network as claimed in claim 1, wherein the first virtual network connection and the second virtual network connection are virtual private network connections on Layer 2.

6. The intermediate network as claimed in claim 5, wherein the connection redundancy protocol comprises a Spanning Tree Protocol, a Media Redundancy Protocol, an Ethernet Ring Protection Protocol or an Ethernet Automatic Protection Switching Protocol.

7. The intermediate network as claimed in claim 1, wherein the connection redundancy protocol comprises a Spanning Tree Protocol, a Media Redundancy Protocol, an Ethernet Ring Protection Protocol or an Ethernet Automatic Protection Switching Protocol.

8. The intermediate network as claimed in claim 7, wherein a domain-internal connection redundancy protocol is implemented in the first network domain, the second network domain, or the first network domain and the second network domain.

\* \* \* \* \*